United States Patent [19]

Chiang

[11] 4,281,825

[45] Aug. 4, 1981

[54] MANUAL HYDRAULIC VISE

[75] Inventor: Nei-Ho Chiang, Kaohsiung, Taiwan

[73] Assignee: Yin-Lung Yang, Kaohsiung, Taiwan; a part interest

[21] Appl. No.: 965,398

[22] Filed: Nov. 27, 1978

[51] Int. Cl.3 ........ B23Q 3/08

[52] U.S. Cl. ........ 269/29

[58] Field of Search ........ 269/20, 25, 27, 29, 269/32

[56] References Cited

U.S. PATENT DOCUMENTS

| | | | |
|---|---|---|---|
| 2,492,338 | 12/1949 | Vickers | 269/25 |
| 3,147,002 | 9/1964 | Arnold | 269/29 |
| 3,348,836 | 10/1967 | Smierciak | 269/25 |
| 4,070,010 | 1/1978 | Brasca | 269/27 |

*Primary Examiner*—Robert C. Watson

[57] ABSTRACT

The invention relates to a manual hydraulic operating vise, said vise comprising a stationary jaw with a cylindrical center assembly formed in the body of the stationary jaw. A movable jaw being firmly connected to a main piston in the center assembly by a movable rod. A handwheel used to operate a control valve to seat or unseat on a boost piston in an inner liner inside of the center assembly. Several internal oil passages are provided therein for free oil flow around the main piston when the control valve is unseated, so that the movable jaw can be positioned manually with least resistance, thus greatly reduce the time for positioning. When the control valve is seated further turning handwheel will operate the movable jaw backward hydraulically to clamp the workpiece with a greater force which is the multiplication of force input on the handwheel because hydraulic and mechanical advantage of the structure.

3 Claims, 1 Drawing Figure

MANUAL HYDRAULIC VISE

An object of this invention is to reduce the adjustment work to a very small amount.

Another object of this invention is to utilize the hydraulic working advantage to save in-put force for tightening the work piece in a vise.

The reasons for saving time and force in-put of this invention are as follows:

(1) By the character of the oil medium and its cyclic flow in the cylinder from any one end to the other end of the piston during the time when the control valve is open, the width of the jaw opening of the vise can be altered in accordance with thickness of the work piece by hand pulling the movable jaws forward or backward easily, therefore saving maneuvering time of the vise.

(2) When the control valve is closed, further movement of the valve will push the boost piston forward to press the oil at the forward end of the piston and tightly clamp the work piece in the jaws.

Due to the opening of the jaws is in accord with the thickness of the work piece as stated, the distance of the movable jaws is very small when tightening, thusly the same work in-put will deliver a larger force out-put.

Figure 1:
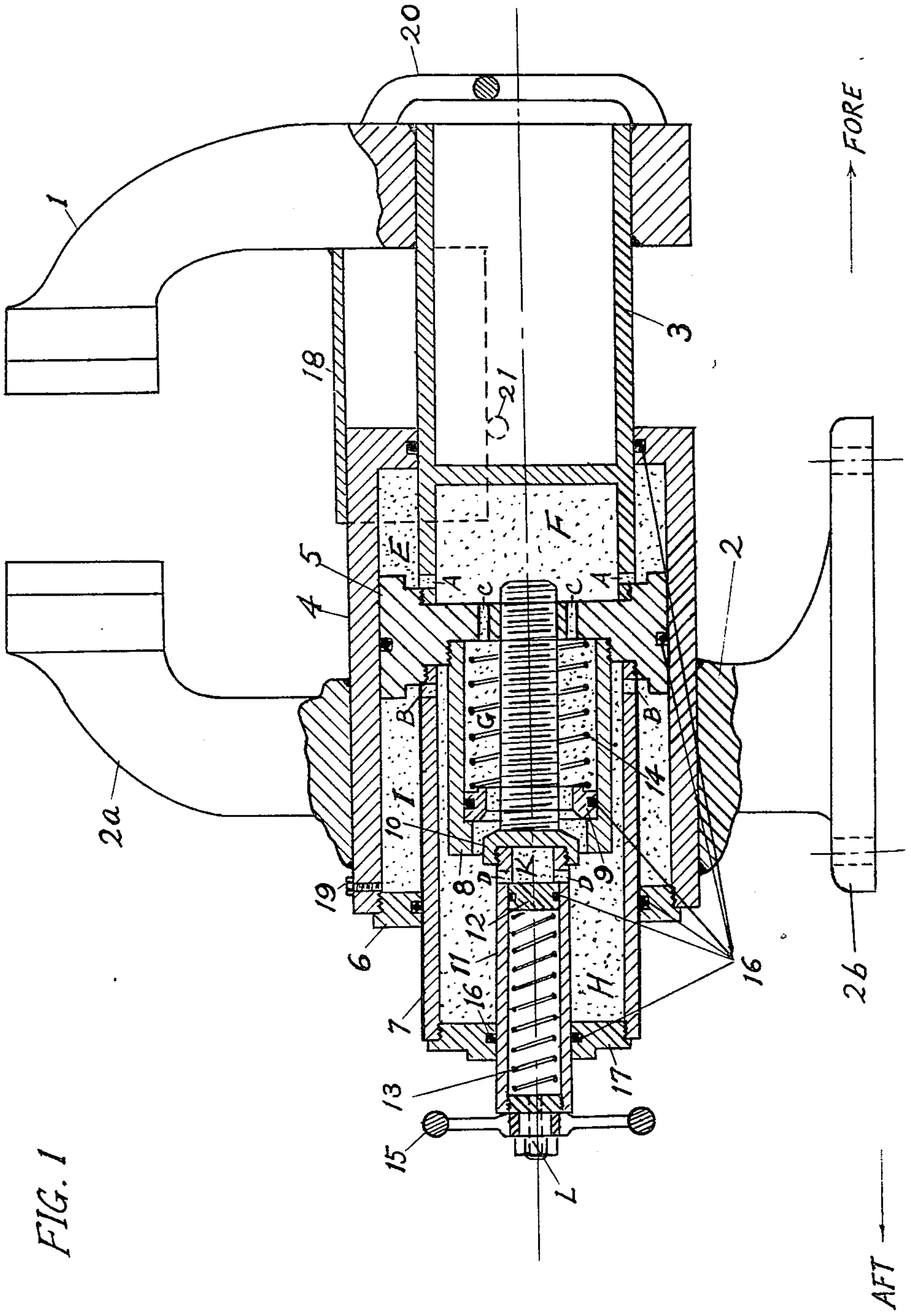
Figure 2:
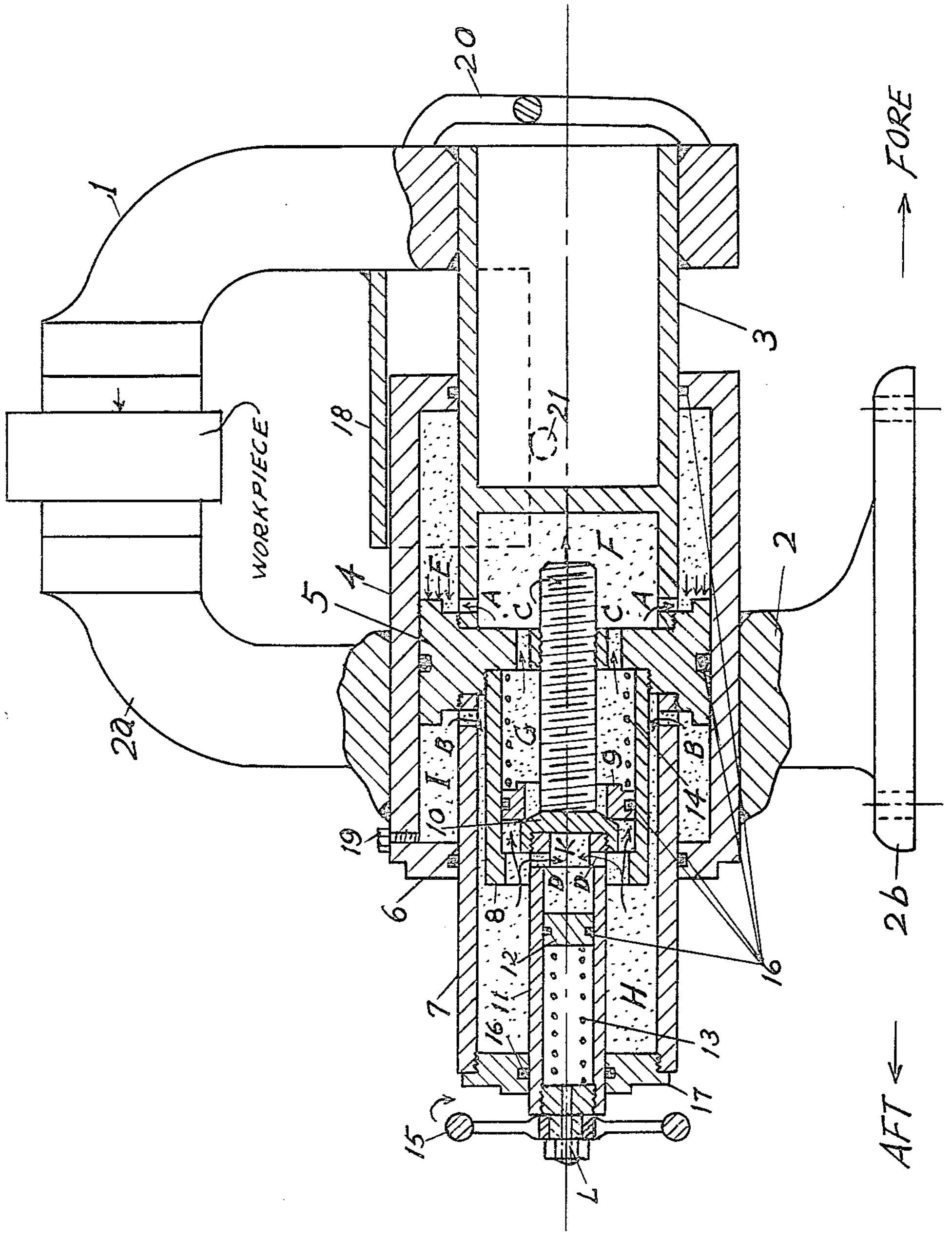

FIG. 1 is a side view with a cut away section of the manually operated hydraulic vise.

CONSTRUCTION (see FIG. 1)

The device is composed of three main parts; movable jaw, fixed body and center assembly:

(1) Movable jaw:

The movable jaw 1 which has an attached pulling bar 20 on its fore-end is made of cast steel (or cast iron). Its upper part is the jaw. There is a hollow circular opening in its lower part where a movable rod 3 can be fitted in (or screwed in). A half-round protecting plate 18 which is with its fore-end attached to the movable jaw can follow the movement of the jaw. The rear end of the protecting plate, rest and slide on the two stop pins 21 fitted on the outer surface of the cylinder 4, can prevent the movable jaw from rotating.

(2) Fixed body:

The fixed body 2 is made of cast steel (or cast iron). Its upper part is the fixed jaw 2*a*. There is a hollow circular opening in its center part where the center assembly can be fitted. Its lower part is the seat 2*b* which can be secured to a working bench or other places.

(3) Center assembly:

The center assembly is a cylinder 4 and its internals (including moving rod 3). There is an end plate 6 and a vent screw 19 on its rear end.

In the cylinder is a piston 5 which can move freely in it. The fore and rear end of the piston are screw threaded where moving rod 3, running cylinder 7 and inner liner 8 can be fitted in respectively. There is a ring groove on the outer surface of the piston for seal ring 16 to fit in. In the center part of the piston, there is a threaded center hole for screwing in or out the control valve 10 and passage holes C for communication of oil.

The moving rod 3 is a hollow tube with its rear part roomed and drilled with passage holes A. The fore end of the rod is fitted in the hollow opening of the movable jaw.

The running cylinder 7 is a hollow tube with an end plate 17 on its rear end. The fore-end of the tube is fitted in the rear end of the piston 5 and with passage holes B for transmitting the oil.

The inner liner 8 is a hollow cylinder with boost piston 9 inside. The fore-end of the liner is fitted in the rear-end of the piston 5.

In the inner liner is a boost piston 9 which can be moved freely in the liner. The boost piston is rested in the after part of the liner by the compression of the spring 14 in front of it. This piston is hollowed and with valve seat inside for seating control valve 10. There is a ring groove on the outer surface of the piston for fitting seal ring 16.

The control valve 10 is a valve which can move forward or backward by screwing in or out piston 5.

The valve rod 11 is a hollow cylinder with a compensating piston 12 inside it. The fore-end of the rod is fixed to the rear-end of the control valve 10 and with passage holes D on it. The rear end of the valve rod is screw threaded inside for fitting hand wheel 15. The retaining screw of the hand wheel has a center hole L for air vent.

The compensating piston 12 can move freely in the valve rod 11. This piston is rested in the fore-end of the valve rod 11 by the compression of the spring 13. On the outer surface of the piston there is a ring groove for fitting seal ring 16.

OPERATION (1) Ready to clamp:

When control valve is open, pull the pulling bar 20 (or push the hand wheel 15) forward or backward to vary the opening of the jaw to fit the thickness of the work piece.

The forward movement of the movable jaw 1 and moving rod 3 forces piston 5 to move forward, oil in front of the piston (chamber E) will be forced to flow through the passage holes A in the rear-end of the moving rod 3 to the chamber F. From the chamber F the oil flows through the passage holes C in the piston 5 to the chamber G. From chamber G the oil flows through the valve seat in the boost piston 9, the space between control valve 10 and inner liner 8, to the chamber H. Then from chamber H the oil flows through the gap between inner liner 8 and running cylinder 7, and the passage holes B at the fore end of the running cylinder to the rear end of the piston 5 (chamber I).

The backward motion of the movable jaw 1 and moving rod 3 forces the piston 5 to move backward, to the contrary, the oil will flow from the rear end (chamber I) to the front end (chamber E) of the piston.

Due to the increasing (or decreasing) space in front of the piston is equal to the decreasing (or increasing) space at the rear end of the piston during movement, the motion of the piston is not restricted, hence the movable jaw can move freely forward or backward during the time when the work piece is not being clamped tightly in the jaws of the vise.

(2) Begin to clamp tightly:

After the width of the jaw opening of the vise fitted to the thickness of the work piece, the second process is to clamp the work piece tightly in the jaws of the vise.

Turn the hand wheel 15 clockwise to screw the control valve toward the piston 5. The control valve 10 will first seat on the boost piston 9 and the free cyclic flow of oil from any end to the other of the piston 5 stops. Meantime, the reducing oil space of the system caused by entering in the control valve is being compensated by pressing the compensating piston 12 backward in the valve rod 11 against the spring 13.

Further forward movement of the control valve 10 will bring the boost piston 9 forward against the retaining spring 14. The oil in chamber G will be pushed to follow through the passage holes C in the piston 5 to the chamber F. From chamber F the oil flows through the passage holes A at the rear end of the moving rod 3 to the chamber E, then the piston 5 will be pushed backward, forcing the oil in chamber I to flow through the passage holes B, the space between running cylinder 7 and inner liner 8, to the chamber H, the oil in the chamber H will flow partly filling the space produced by forward movement of the control valve 10 and the boost piston 9, and partly flowing through the passage holes D at the forward end of the valve rod 11 to the chamber K, pressing the compensating piston 12 backward to gain more space for compensation, thusly the work piece is tightly clamped in the jaws of the vise.

(3) To loosen the work piece from the jaw:

Turn the hand wheel 15 counter clockwise. The control valve 10 will move backward, boost piston 9 will slide back by the compression force of the spring 14 to its original position. Further backward movement of the control valve 10 will open the valve from its seat in boost piston 9 to release the oil pressure in front of the piston 5, the device is ready for clamping and the movable jaw 1 can be moved easily by hand.

CALCULATION OF ACTING FORCE

Let:

$D$=Diameter of the hand wheel 15 in CMS $F_1$=Force acting on the circumference of the hand wheel 15 in KGS.

$P_1$=Force acting in front of the boost piston 9 after control valve 10 is closed (in KGS).

$A_1$=Effective pressure area in front of the boost piston 9 after the control valve 10 is closed (in $CM^2$).

$D_1$=Thread pitch of the screw of the control valve 10 (in CM).

$F_2$=Force to clamp work piece tightly on the vise in KGS.

$A_2$=Effective pressure area in front of the piston 5 in $CM^2$.

$P$=Pressure in KGS per square CM.

When turn the hand wheel 15 one turn, and neglect all the frictions and resitant force of the spring:

$F_1S_1=P_1D_1,\quad F_1\pi D=P_1D_1,\quad P=P_1/A_1=F_2/A_2$ $\therefore F_1\pi D=F_2D_1A_1/A_2,\ F_2=F_1\pi DA_2/D_1A_1$—(1).

Suppose $F_1=\frac{1}{2}$ KG, $A_2/A_1=3$, $D=7.5$ CM, $D_1=0.12$ CM From (1) $F_2=\frac{1}{2}\times 7.5\times 3\pi/0.12=300$ KGS.

What I claim is as follows:

1. In combination, a vise having hydraulically transacting mechanisms for clamping work-piece, said vise comprises particularly a center assembly which is filled with an oil medium and within the body of the vise, said center assembly consists of essentially a working piston, a cylinder fixedly mounted in the body of the stationary jaw of the vise, a movable rod integrally connected to the movable jaw of the vise, a running cylinder including an inner liner with a boost piston and a control valve with a compensating piston, said running cylinder together with its components being threaded to the back face of said working piston while said movable rod is fastened to the front face of the working piston, several holes are drilled in (drilled at proper location of) each said parts in the assembly which serves as passages for cyclic flow of the oil medium.

2. In combination, a vise according to claim 1, said movable rod together with movable jaw can be pulled backward or forward freely by hand when said control valve is in the unseated position to vary the opening of the jaws in accordance with the thickness of the work-piece to be clamped.

3. In combination, a vise according to claim 1, when said control valve is seated, the boost piston being pushed forward by further movement of the valve and begins to build up oil pressure in front of the working piston, in turn, to move further backward of the movable jaw to tighten against (in a least distance for tightening) the work-piece, said compensating piston will compensate the oil displacement when said working piston is moved.

* * * * *